United States Patent
Ramaswamy et al.

(10) Patent No.: US 6,510,164 B1
(45) Date of Patent: *Jan. 21, 2003

(54) USER-LEVEL DEDICATED INTERFACE FOR IP APPLICATIONS IN A DATA PACKET SWITCHING AND LOAD BALANCING SYSTEM

(75) Inventors: Kumar Ramaswamy, San Jose, CA (US); Cher-Wen Lin, Milpitas, CA (US); Randall David Rettberg, Danville, CA (US); Mizanur Mohammed Rahman, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/193,651

(22) Filed: Nov. 16, 1998

(51) Int. Cl.$^7$ .................................................. H04J 3/16
(52) U.S. Cl. ........................ 370/466; 370/235; 370/353; 370/401; 370/463; 709/321; 709/223
(58) Field of Search ................................ 370/229, 235, 370/351, 352, 353, 354, 356, 389, 392, 400, 401, 428, 463, 465, 466, 449; 709/521, 322, 323–327, 223, 312, 321

(56) References Cited

U.S. PATENT DOCUMENTS

| | | | |
|---|---|---|---|
| 5,535,199 A | * 7/1996 | Amri ........................... | 370/392 |
| 5,581,729 A | 12/1996 | Nishtala et al. | |
| 5,634,068 A | * 5/1997 | Nishtala et al. ............. | 711/141 |
| 5,644,753 A | 7/1997 | Ebrahim et al. | |
| 5,655,100 A | * 8/1997 | Ebrahim et al. ............ | 711/144 |
| 5,657,472 A | 8/1997 | Van Loo et al. | |
| 5,768,510 A | * 6/1998 | Gish ........................... | 709/203 |
| 5,771,349 A | 6/1998 | Picazo, Jr. et al. ...... | 395/188.01 |
| 6,006,275 A | * 12/1999 | Picazo, Jr. et al. .......... | 709/249 |
| 6,246,680 B1 | * 6/2001 | Muller et al. ................ | 370/389 |
| 6,252,878 B1 | * 6/2001 | Locklear, Jr. et al. ....... | 370/401 |
| 6,253,230 B1 | * 6/2001 | Couland et al. ............ | 709/203 |
| 6,272,136 B1 | * 8/2001 | Lin et al. .................... | 370/392 |
| 6,272,522 B1 | * 8/2001 | Lin et al. .................... | 709/200 |

OTHER PUBLICATIONS

"U–Net: A User–Level Network Interface For Parallel And Distributed Computing" by Eicken et al., ACM Press, Operating Systems Review, vol. 29, No. 5, Dec. 1995, pp. 40–53.
"IP/ATM: A Strategy For Integrating IP With ATM" By Guru Parulkar, Douglas C. Schmidt, and Jonathan S. Turner, Computer Communications Review, US, Association For Computing Machinery, New York, vol. 25, No. 4, Oct. 1, 1995, pp. 49–58.

* cited by examiner

*Primary Examiner*—Ricky Ngo
*Assistant Examiner*—Tri H. Phan
(74) *Attorney, Agent, or Firm*—O'Melveny & Myers LLP

(57) ABSTRACT

A multiprocessor computer system comprises a plurality of network interfaces each adapted to be coupled to respective external networks for receiving and sending data packets to and from remote devices coupled to the external networks via a particular communication protocol. The multiprocessor computer system further comprises a plurality of symmetrical processors including a control processor and at least one switching processor. The switching processor further includes at least one network application executing thereon. The control processor further includes an operating system portion having a kernel memory and at least one network driver communicating with the plurality of network interfaces. A buffer descriptor list is accessible by the network application and the network driver. The buffer descriptor list defines the status of buffers provided in the kernel memory that are used for temporary storage of data packets transferred between the network application and the plurality of network interfaces via the network driver. Data packets received by the network interfaces from the external networks directed to the network application are placed in selected ones of the buffers by the network driver for direct access by the network application. Similarly, data packets transmitted from the network application to the external networks are placed in other selected ones of the buffers for direct access by the network driver.

23 Claims, 9 Drawing Sheets

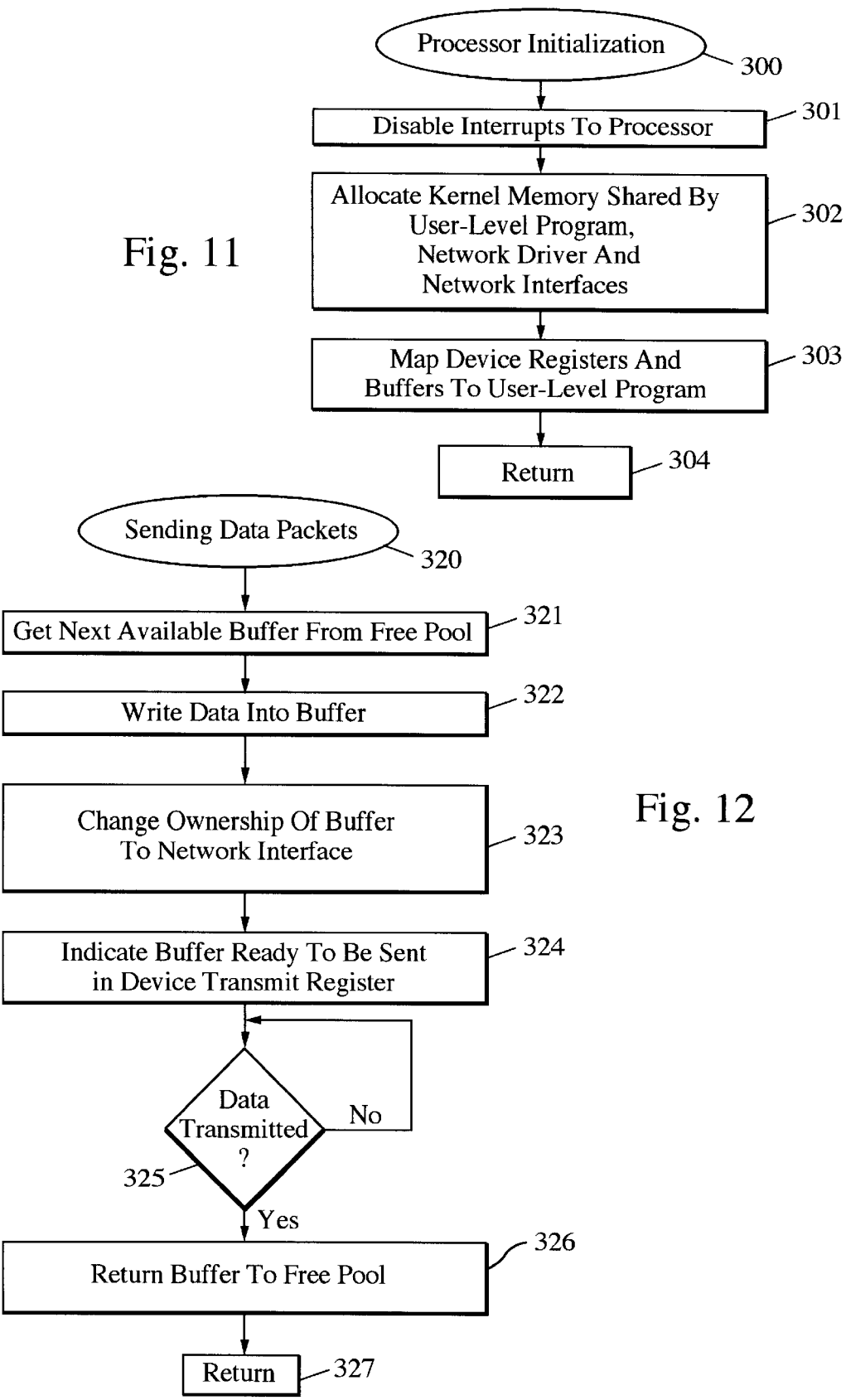

USER-LEVEL DEDICATED INTERFACE FOR IP APPLICATIONS IN A DATA PACKET SWITCHING AND LOAD BALANCING SYSTEM

BACKGROUND OF THE INVENTION

1. Field of the Invention

The present invention relates generally to computer data communication networks, and more particularly, to a multiprocessor computer architecture having plural switching modules for transferring data packets between computer networks and a control module for performing load balancing to ensure efficient utilization of the computer networks in which a software interface is defined between the switching module and the operating system for transferring data packets therebetween.

2. Description of Related Art

Computer networks are widely used as a way to communicate messages between computers. The Internet is made up of more than 100,000 interconnected computer networks spread across over 100 countries, including commercial, academic and government networks. Originally developed for the military, the Internet has become widely used for academic and commercial research. Today, the Internet has become commercialized into a worldwide information highway, providing information on every subject known to humankind. Similarly, businesses and other entities have adopted the Internet paradigm as a model for their internal networks, or so-called "intranets."

Messages transferred between computers within a network are typically broken up into plural data packets. Packet switching systems are used to route the data packets to their required destination and enable the efficient handling of messages of different lengths and priorities. Since each data packet includes a destination address, all packets making up a single message do not have to travel the same path. Instead, the data packets can be dynamically routed over the interconnected networks as circuits become available or unavailable. The destination computer receives the data packets and reassembles them back into their proper sequence to reconstruct the transmitted message.

Internet computer networks generally use the TCP/IP communications protocol, which is an acronym for Transmission Control Protocol/Internet Protocol. The TCP portion of the protocol provides the transport function by breaking a message into smaller packets, reassembling the packets at the other end of the communication network, and re-sending any packets that get lost along the way. The IP portion of the protocol provides the routing function by giving the data packets an address for the destination network and client at the destination network. Each data packet communicated using the TCP/IP protocol includes a header portion that contains the TCP and IP information. Another communication protocol used in communication between Internet computer networks is UDP/IP, in which UDP is an acronym for User Datagram Protocol. UDP is used in place of TCP in conditions when a reliable delivery is not required. For example, UDP/IP is often used for real-time audio and video traffic where lost data packets are simply ignored, because there is no time to retransmit. Since the computer networks connected to the Internet may use other communication protocols besides TCP/IP or UDP/IP, gateways are used to convert data packets from these protocols into the other protocols.

At a destination network, one or more routers may be utilized to receive incoming data packets and route the packets to other internal networks such as local area networks (LAN). The internal networks may further include servers that supply information to one or more clients. The servers are generally high-speed microcomputers, minicomputers or even mainframes. In some cases, the clients are internal to the network (i.e., at the back-end), and the router acts as a conduit for communication of data packets between the clients and the outside world. The back-end servers may provide various application functions for the clients, such as a database server that maintains the databases and processes requests from clients to extract data from or update the databases. In other cases, the clients are external to the network (i.e., at the front-end), and the router acts as a conduit for communication of data packets between the clients and the back-end servers. For example, an Internet application server at the back-end may host Web applications within the network that are accessed by clients outside the network. In still other cases, the clients are both internal and external to the network. The routers perform the functions of switching data packets between the internal and external networks, and balancing the load placed upon the back-end servers of the internal network by distributing message packets between the back-end servers in the most efficient and expeditious manner.

In view of the high volume of message traffic that they process and the relatively limited kinds of tasks that they perform, routers typically comprise dedicated switching processors having an architecture optimized to provide these functions. These conventional dedicated switching processors include a control module and a switching module that are viewed by the external networks as a single network entity. A drawback of such dedicated switching processors is that they can be very expensive due in part because they are manufactured in relatively low volumes as compared with other general-purpose computer systems. Moreover, the software that provides the message routing and load balancing functions must be written specifically for the dedicated switching processors, which further increases the cost of purchasing, operating and maintaining such systems. An additional drawback of dedicated switching processors is that most modifications to their functionality require a hardware change, which is typically more expensive and difficult than a software change.

A further disadvantage of dedicated switching processors is that it is cumbersome to communicate data packets between the switching module and the control module. Generally, the control module communicates with the switching module through special internal interfaces that add overhead to both the control module and the switching module, and is thus undesirable. For example, the control module may include network applications that operate at the user level, and data input and output for the network applications is handled at the operating system level. The operating system communicates with the network devices and issues interrupts to the network applications at the user level to indicate the receipt of data. These conventional systems are inefficient since processing of the network applications is stopped each time an interrupt is issued, and the involvement of the operating system further reduces the efficiency of the network applications.

It would therefore be very desirable to provide the message routing and load balancing functions of a network router within a general-purpose symmetrical multiprocessor (SMP) computer system. Such general-purpose multiprocessor computer systems are less expensive than conventional systems due to their larger volume production, and changes to their functionality can be readily accomplished by modifying their software rather than their hardware. It would additionally be desirable to provide network applications operating on a general-purpose multiprocessor computer system direct access to the network interfaces and to run the network applications on a dedicated processor which is not interrupted. Certain applications such as Internet telephony or fax applications would particularly benefit from such direct network access.

SUMMARY OF THE INVENTION

In accordance with the teachings of the present invention, a data packet switching and server load balancing device is provided by a general-purpose multiprocessor computer system. The general-purpose multiprocessor computer system comprises a plurality of symmetrical processors coupled together by a common data bus, a main memory shared by the processors, and a plurality of network interfaces each adapted to be coupled to respective external networks for receiving and sending data packets via a particular communication protocol, such as Transmission Control Protocol/Internet Protocol (TCP/IP) or User Datagram Protocol (UDP).

More particularly, a first one of the processors is adapted to serve as a control processor and remaining ones of the processors are adapted to serve as data packet switching processors. The data packet switching processors are each coupled to at least one of the plurality of network interfaces. The control processor receives raw load status data from agents running on the back-end application servers and generates load distribution configuration data therefrom. The load distribution configuration data is stored in the main memory for access by the data packet switching processors. The switching processors route received ones of the data packets to a selected one of the external networks in accordance with information included in a header portion of the data packets and the load distribution configuration data. The switching processors perform periodic polling of corresponding ones of the network interfaces to detect a received one of the data packets therein. In addition, the switching processors re-write the routing information included in the header portion of the data packets to reflect the selected one of the external networks.

In an embodiment of the invention, a multiprocessor computer system comprises a plurality of network interfaces each adapted to be coupled to respective external networks for receiving and sending data packets to and from remote devices coupled to the external networks via a particular communication protocol. The multiprocessor computer system further comprises a plurality of symmetrical processors including a control processor and at least one switching processor. The switching processor further includes at least one network application executing thereon. The control processor further includes an operating system portion having a kernel memory and at least one network driver communicating with the plurality of network interfaces. A buffer descriptor list is accessible by the network application and the network driver. The buffer descriptor list defines the status of buffers provided in the kernel memory that are used for temporary storage of data packets transferred between the network application and the plurality of network interfaces via the network driver. Data packets received by the network interfaces from the external networks directed to the network application are placed in selected ones of the buffers by the network driver for direct access by the network application. Similarly, data packets transmitted from the network application to the external networks are placed in other selected ones of the buffers for direct access by the network driver.

A more complete understanding of the software interface between switching and control modules of a computer data packet switching and load balancing system will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 11 is a flow chart illustrating a process of initializing the switching processor for user-level access to the network interfaces;

FIG. 12 is a flow chart illustrating a process of sending data packets to a network interface at the user level.

DETAILED DESCRIPTION OF THE PREFERRED EMBODIMENT

The present invention satisfies the need for a general-purpose multiprocessor computer system adapted to provide message routing and load balancing functions for a computer network. In the detailed description that follows, like element numerals are used to describe like elements depicted in one or more of the figures.

Figure 1:
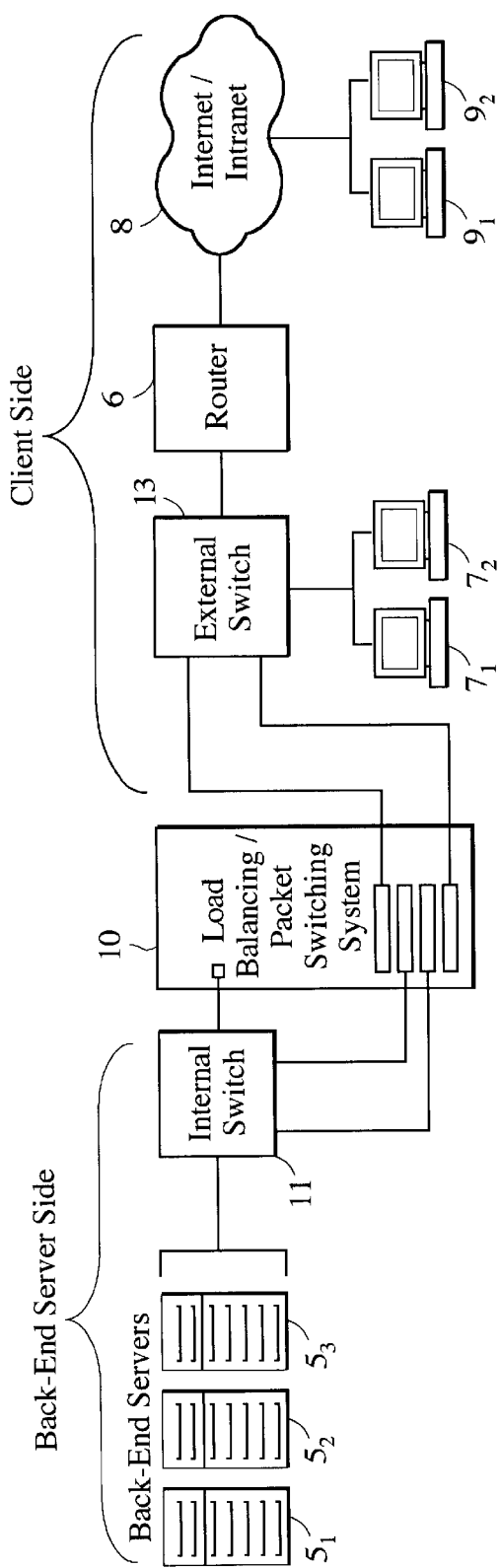
FIG. 1 is a block diagram of a network configuration having a load balancing and packet switching device in accordance with the present invention.

Referring first to FIG. 1, an exemplary network configuration using a load balancing and packet switching system 10 of the present invention is illustrated. The network elements illustrated to the left of the load balancing and packet switching system 10 in FIG. 1 are referred to as the "back-end server" side of the network, and the network elements illustrated to the eight of the load balancing and packet switching system 10 are referred to as the "client"

side of the network. On the client side of the network, the load balancing and packet switching system 10 is coupled through two separate network channels to an external network switch 13. The external switch 13 is coupled to client stations $7_1-7_2$, permitting communication between the client stations and the back-end server side of the network. The external switch 13 is further connected to the Internet (or an intranet) 8 servicing client stations $9_1-9_2$ through a router 6. On the back-end server side of the network, the load balancing and packet switching system 10 is coupled through two separate network channels to an internal network switch 11. The internal switch 11 is further coupled to back-end servers $5_1-5_3$. Thus, data packets originated at the client side of the network, such as from client stations $9_1-9_2$ or $7_1-7_2$, and directed to the back-end side of the network pass through the external switch 13 to the load balancing and packet switching system 10, which determines the routing of the data packets to the back-end servers $5_1-5_2$ through the internal switch 11. Conversely, datar packets originated at the back-end side of the network and directed to the client side of the network follow the same path in reverse.

As known in the art, a network switch is a device that cross connects network nodes or LAN segments and allows full bandwidth to pass between connected nodes. Alternatively, the internal or external switches 11, 13 could be provided by a network hub, which is a device that connects nodes by sharing the bandwidth between the connected nodes. Network switches are advantageous over network hubs in view of their greater capacity and speed. As also known in the art, a router is a device that routes data packets between networks. Routers read the network address in each transmitted data packet and make a decision on how to send it based on the most expedient route (traffic load, line costs, speed, bad lines, etc.). Alternatively, the router 6 may be provided by a network switch or hub. It should be appreciated that various alternative network configurations are anticipated, and moreover, that the numbers of clients, back-end servers and network channels shown in FIG. 1 are purely for the purpose of illustration and are not intended to limit the scope of the invention in any way.

Figure 2:
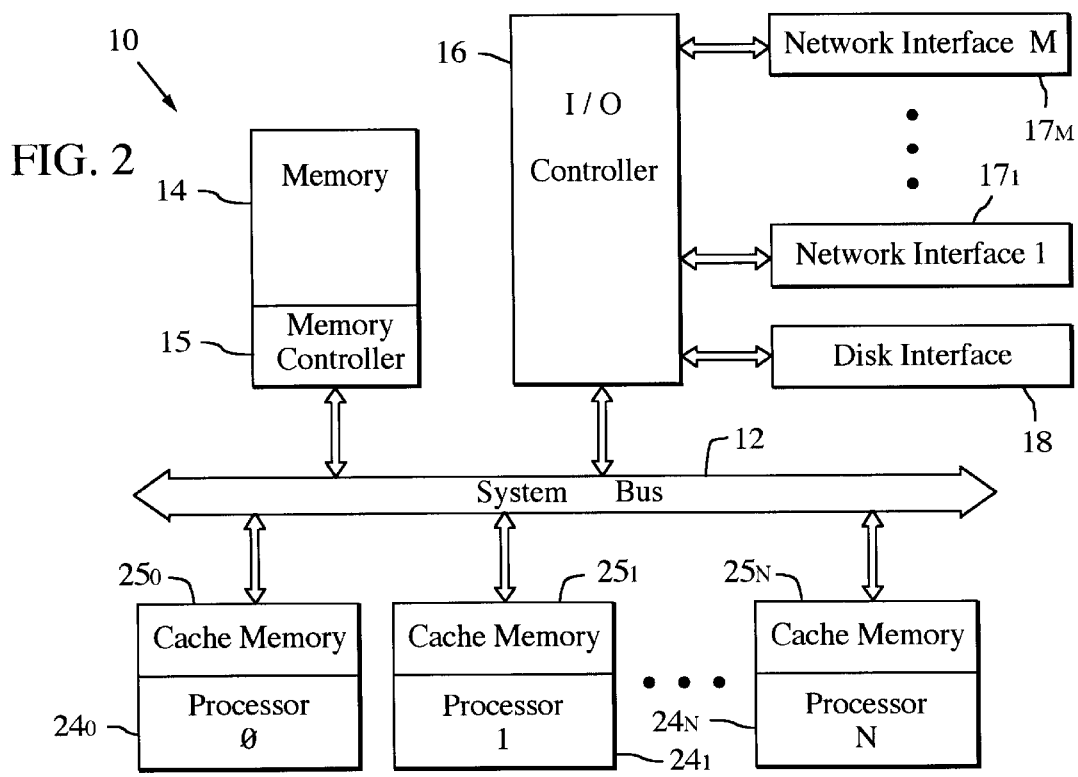
FIG. 2 is a block diagram of a general-purpose symmetrical multiprocessor computer system adapted to provide the load balancing a packet switching device.

Referring now to FIG. 2, there is shown a general-purpose symmetrical multiprocessor (SMP) computer adapted to provide the load balancing and packet switching system 10 of FIG. 1. The SMP computer includes N individual processors $24_0-24_N$ coupled to a common system bus 12. Each one of the N processors $24_0-24_N$ has an associated cache memory $25_0-25_N$. The processors $24_0-24_N$ may be provided by 64-bit UltraSPARC microprocessors sold by Sun Microsystems, Inc. The SMP computer further includes a main memory 14 and a memory controller 15 coupled to the common system bus 12. The main memory 14 contains stored data and instructions accessible by each of the processors $24_0-24_N$ with the memory controller 15 controlling individual accesses to the main memory. As known in the art, the cache memory $25_0-25_N$ bridges the main memory 14 and the processors $24_0-24_N$. The cache memory $25_0-25_N$ is faster than the main memory 14 and allows instructions to be executed and data to be read at higher speed. Instructions and data are transferred to the cache memory $25_0-25_N$ in blocks using a look-ahead algorithm. The more sequential the instructions in the routine being accessed, and the more sequential the order of the data being read, the more chance the next desired item will still be in the cache memory $25_0-25_N$, and the greater improvement in performance. It is anticipated that the cache memory $25_0-25_N$ be comprised of static random access memory (SRAM) chips, while dynamic RAM (DRAM) chips are used for main memory 14.

Alternatively, the cache memory $25_0-25_N$ may be provided directly onto the same chips as the corresponding processors $24_0-24_N$.

An input/output (I/O) controller 16 is also coupled to the common system bus 12, and controls the transfer of data between the processors $24_0-24_N$ and peripheral devices. In particular, the I/O controller 16 is coupled to a disk interface device 18 which controls exchanges of data between the processors $24_0-24_N$ and one or more disk storage devices. The I/O controller 16 is also coupled to M network interface devices $17_1-17_M$ which each control exchanges of data between the processors $24_0-24_N$ and external computer networks, clients or servers. Each one of the network interface devices $17_1-17_M$ include a receive queue in which received data packets are temporarily held while awaiting processing by the SMP computer, and a transmit queue in which transmitted data packets are temporarily held while awaiting communication to a computer network. It should be appreciated that the N number of processors $24_0-24_N$ would generally be equal to or less than the M number of network interface devices $17-17_M$. Each of the M network interface devices $17_1-17_M$ may communicate with plural computer networks, clients or servers, using conventional network protocols such as Ethernet, Token Ring, Asynchronous Transfer Mode (ATM), etc.

It should be appreciated that the SMP computer may further include a keyboard and monitor (not shown) to permit access by management information services (MIS) personnel, such as to perform diagnostics, routine maintenance, and administrative level tasks. As will be further described below, the SMP computer is adapted to provide message routing and load balancing; functions that would not require any direct user interaction, and the keyboard and monitor would therefore serve little use during ordinary operation of the computer system. However, certain applications of the load balancing and message routing system do include user applications running on the SMP computer, and for such applications it should be appreciated that a keyboard and monitor would be necessary. It is anticipated that the SMP computer include a multitasking, multiprocessing operating system, such as the Solaris operating system by Sun Microsystems, Inc.

Figure 3:
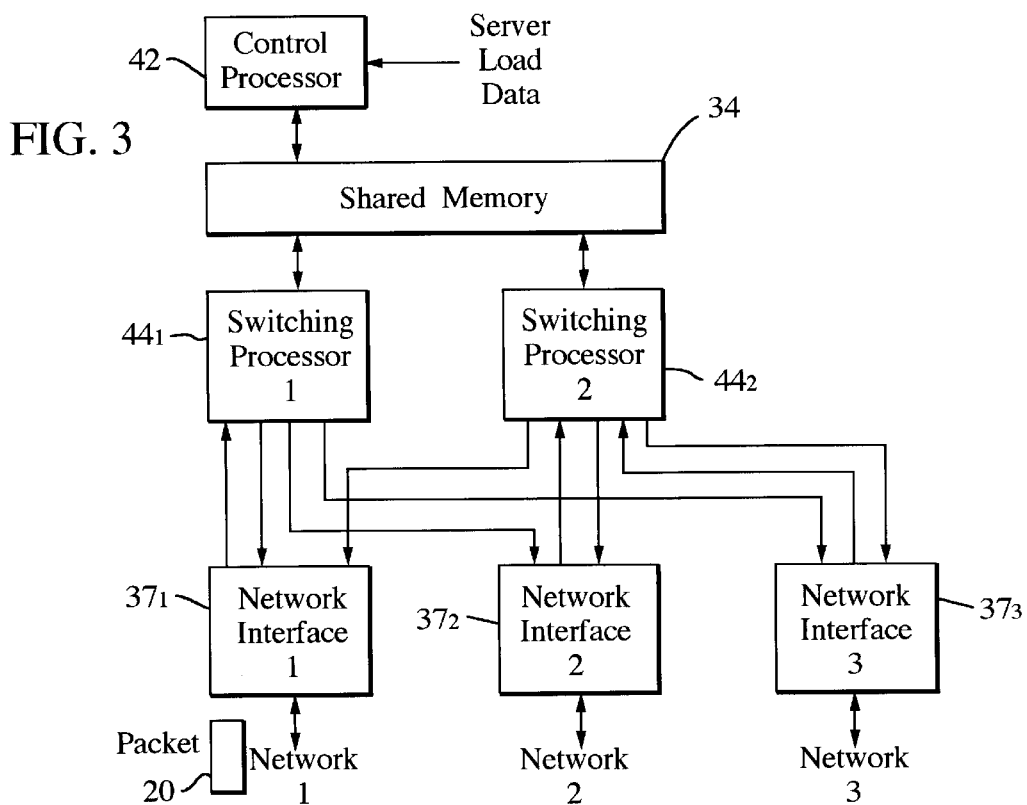
FIG. 3 is a block diagram of the general-purpose multiprocessor computer system configured to provide a switching processor to perform network data packet switching and a control processor to perform network load balancing.

Referring now to FIG. 3, a block diagram of the general-purpose SMP computer configured to provide network data packet switching and load balancing functions is illustrated. In the load balancing and packet switching system 10, one of the plural processors $24_0-24_N$ of FIG. 1 serves as a control processor 42, and the remaining processors serve as switching processors $44_1$ and $44_2$. The control processor 42 and switching processors $44_1$ and $44_2$ each have access to a shared memory space 34, such as provided by a portion of the main memory 14 of FIG. 1. The control processor 42 handles administrative and configuration functions for the load balancing and packet switching system 10, and also communicates with agents on the application servers to collect system load information. The control processor 42 then performs complex calculations on the raw system load information and defines an optimum traffic load distribution. The traffic load distribution result is then written into the shared memory space for use by the switching processors $44_1$ and $44_2$. The switching processors $44_1$ and $44_2$ exclusively perform the packet switching tasks, and do not handle any other computing tasks. Although two switching processors $44_1$ and $44_2$ are depicted in FIG. 3, it should be appreciated that any number of switching processors can be advantageously utilized.

The switching processors $44_1$ and $44_2$ are each coupled to plural network interfaces $37_1-37_3$, such as provided by the network interfaces $17_1$–$17_M$ of FIG. 2. Each respective one of the switching processors $44_1$ and $44_2$ poll corresponding ones of the plural network interfaces $37_1$–$37_3$ for incoming data packets 20 present on their respective receive queues. Particularly, switching processor $44_1$ polls the receive queue of network interface $37_1$, and switching processor $44_2$ polls the receive queue of network interfaces $37_2$ and $37_3$. Since; each of the switching processors $44_1$ and $44_2$ poll different ones of the network interfaces $37_1$–$37_3$, conflicts between the switching processors over received data packets is avoided. In contrast, each one of the switching processors $44_1$ and $44_2$ can supply data packets to the transmit queues of each one of the network interfaces $37_1$–$37_3$, so that data packets can then be routed to any computer network coupled to the load balancing and packet switching system 10.

Figure 4:
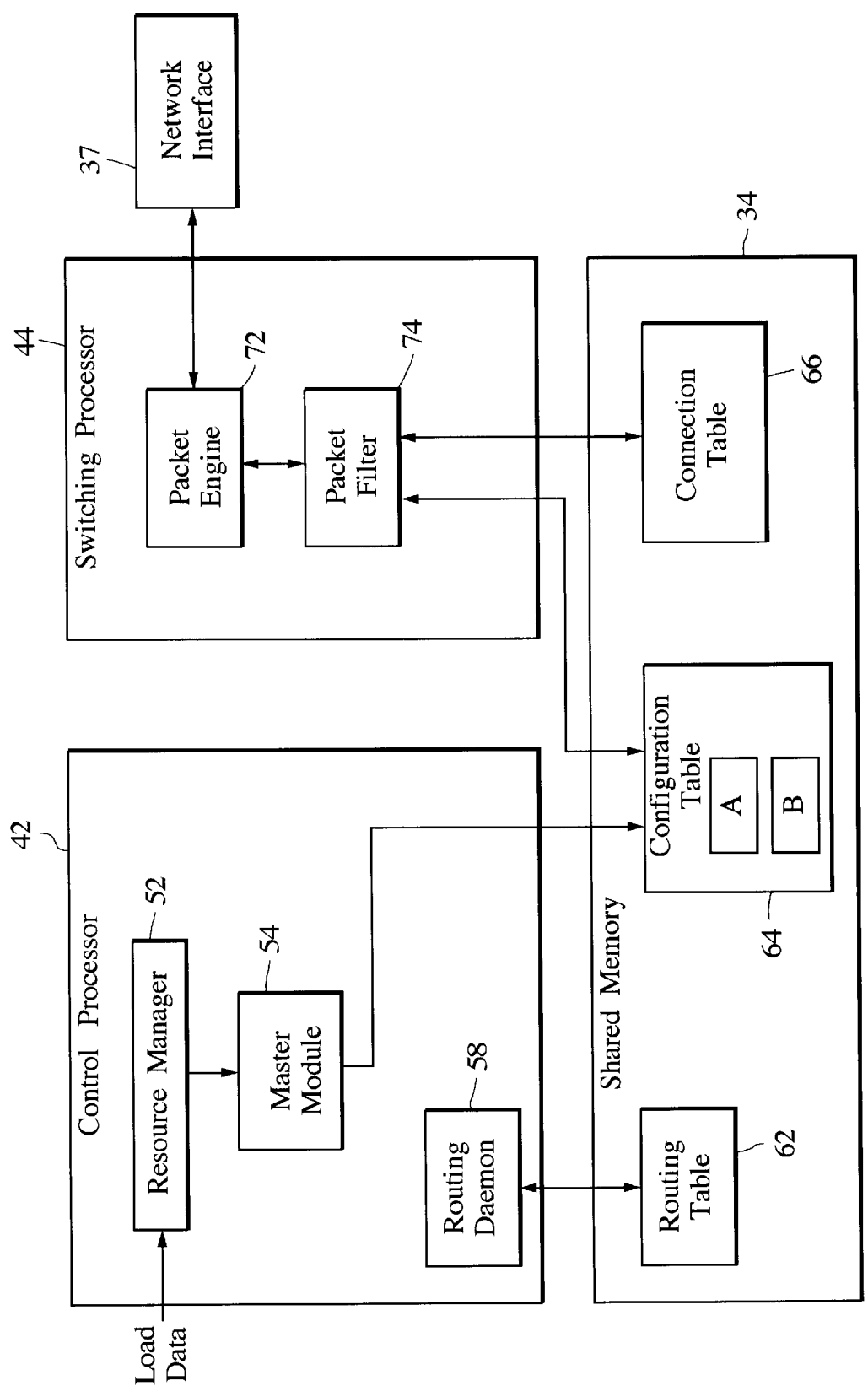
FIG. 4 is a block diagram depicting communication of information between the control processor and one of the switching processors.

FIG. 4 illustrates in greater detail the communication of information between the control processor 42 and one of the switching processors 44. The control processor 42 further includes several software modules to handle discrete control tasks, including a resource manager module 52 and a master module 54. The control processor 42 may further include specialized application program interfaces (API) that handle communication between these software modules. The resource manager module 52 receives raw data from the back-end application servers indicating their present load status. This raw data includes various factors, including the number of clients presently being served, the utilization rates of the CPU and memory of the application server processor, the average execution time, and the number of requests per second. The raw load data is then provided to the master module 54, which synthesizes the data into a desired load distribution in accordance with a predetermined distribution algorithm. For example, the distribution algorithm may favor distribution of incoming packets so that all servers have an even load, or alternatively, may favor distribution of incoming packets to certain servers having unique applications or processing capability. Such distribution algorithms are well known in the art. It is also anticipated that the resource manager module 52 can be provided as a separate device entirely external to the control processor 42.

The shared memory 34 further includes a routing table 62, a configuration table 64, and a connection table 66. The routing table 62 is a database that contains the current network topology, and is accessed by the switching processor 44 in determining routing information for the received data packets. Specifically, the routing table 62 defines the addresses and interconnection pathways between the load balancing and packet switching device 10 and the networks connected thereto. A routing daemon 58 within the control processor 42 is a program that executes in the background to retrieve the information stored in the routing table 62 and maintains the status of the routing table 62 as changes are made to the configuration. As generally known in the art, the routing daemon 58 functions like an extension to the operating system, and does not otherwise interact with the other modules of the control processor 42 or the switching processor 44 discussed above.

The load distribution data synthesized by the master module 54 is stored in the configuration table 64. The configuration table includes two redundant memory buffers, identified in FIG. 4 as A and B. At any given time, one of the two memory buffers is the active buffer and the other is the back-up buffer. A memory pointer within the shared memory 34 defines which one of the two buffers is currently the active buffer. The switching processor 44 obtains the current load distribution data from the active buffer. The master module 54 of the control processor 42 periodically provides updated load distribution data to the shared memory 34 that is written to the back-up buffer. Thereafter, the memory pointer switches from the active to the back-up buffer so that the updated load distribution data is accessible to the switching processor 44. This double buffering technique speeds up operation of the load balancing and packet switching system 10 by enabling load data processing to occur concurrently with packet switching, and prevents potential conflicts between the switching processor 44 and the control processor 42 that both need access to the same memory space.

Figure 9:
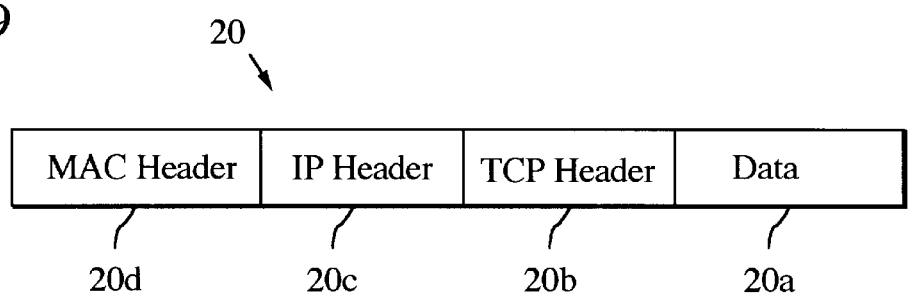
FIG. 9 is a block diagram illustrating the portions of a data packet.

The connection table 66 maintains a record of the TCP and UDP connections routed by each of the switching processors 44. As discussed above, the data packets received by the switching processors 44 each contain transport data in the header (i.e., TCP or UDP data) that defines how the data packets should be reassembled with other data packets to reconstruct complete messages, or connections. As shown in FIG. 9, the data packets 20 generally have an IP address which is provided in an IP header 20c to define the destination device as known to the external computer networks. This external IP address may actually be different than the internal IP address of the back-end application server selected by the load balancing and packet switching system 10. Accordingly, the entries of the connection table 66 map the external IP address to the internal IP address. Following the IP header 20c, a TCP (or UDP) header 20b contains the transport data. The data portion 20a of the data packet 20 is provided after each of the foregoing headers. Returning now to FIG. 4, a new entry is added to the connection table 66 after a first data packet of a new connection is received. The transport data for each of the received data packets is provided to the connection table 66 by the switching processor 44.

Once the IP address is translated by the connection table 66, the switching processor 44 determines a Media Access Control (MAC) address using an address resolution protocol (ARP). According to the ARP, a remote network node desiring to transmit a data packet to another node transmits an ARP broadcast packet that is received by every node connected to the network. The receiving node responds with an ARP response packet that contains the MAC address of the receiving node. Thereafter, the remote network node uses the MAC address in a MAC header 20d of subsequent data packets. The remote network node then saves the MAC address in the ARP cache memory so that it won't need to send another ARP broadcast packet again.

Like the control processor, the switching processor 44 also includes software modules to handle discrete tasks, including a packet engine module 72 and a packet filter module 74. The packet engine module 72 communicates with the network interface 37 to periodically poll for the presence of data packets in the receive queue, and delivers packets to the transmit queue to be sent to the external networks. The packet filter module 74 reads the IP and TCP/UDP data in the packet header to determine how to route the data packet. The packet filter module 74 accesses the connection table 66 in the shared memory 34 to determine whether a received packet is part of an existing connection or a new connection. Then, the packet filter module 74 accesses the configuration table 64 to determine the proper routing of the received data packet based on current load conditions and other factors. The switching processor 44 may further include specialized APIs that handle communication between these software modules.

Figure 5:
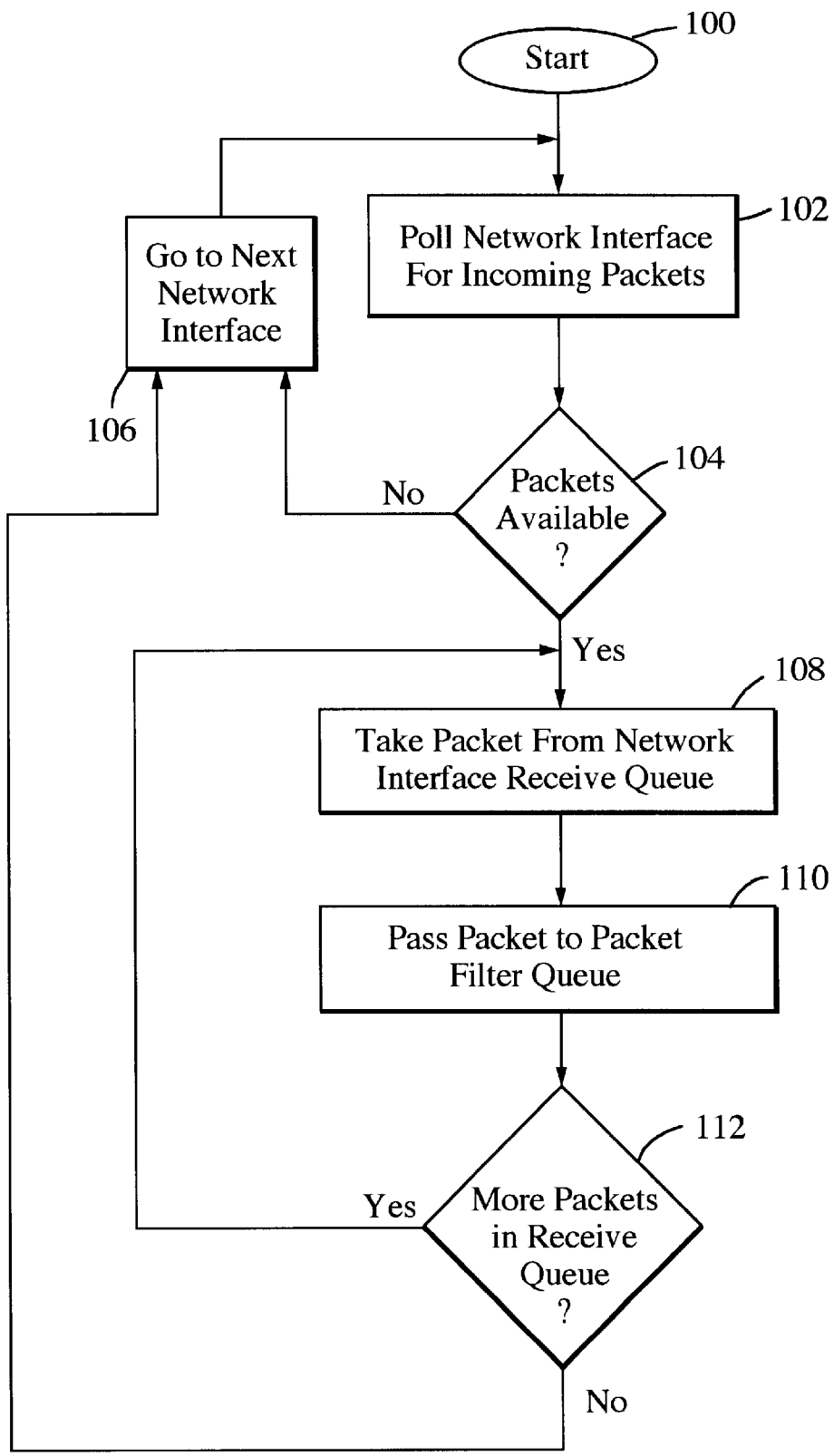
FIG. 5 is a flow chart illustrating operation of the packet engine module of the switching processor.

The flow chart of FIG. 5 illustrates the software process performed by the packet engine module 72 of FIG. 4. The software process operates in a tight loop so as to minimize the latency of data packets waiting in the network interface receive queue. The process is initialized at step 100, during which the switching processor 44 performs certain start-up tasks, including checking the routing table 62 in the shared memory 34. It is anticipated that the load balancing and packet switching device 10 remain continuously in an operational state, and so this initialization step may only be executed rarely.

A first processing loop begins with step 102, in which the packet engine module 72 polls the network interface 37 receive queue. At step 104, the packet engine module 72 determines whether there are any data packets available at the receive queue. If no data packets are available, the packet engine module 72 changes to the next network interface 37 at step 106. As discussed above, a single switching processor 44 may be responsible for receiving incoming data packets from plural ones of the network interfaces. It should be appreciated, however, that if the switching processor 44 only has responsibility for one network interface 37, then this step 106 may be bypassed. After step 106, the packet engine module 72 returns to step 102. This first processing loop will repeat indefinitely until a received data packet is detected at step 104. If a data packet is available in the network interface receive queue, a second processing loop begins at step 108 at which the packet engine module 72 retrieves the data packet. Then, at step 110, the retrieved data packet is passed to the packet filter module 74 for routing (described below). Thereafter, at step 112, the packet engine module 72 determines whether additional packets are present at the network interface receive queue. If additional packets are present, the packet engine module 72 returns to step 108 and the second processing loop is repeated. If no additional packets are present, the packet engine module 72 returns to step 106 and the next network interface is polled.

Figure 6:
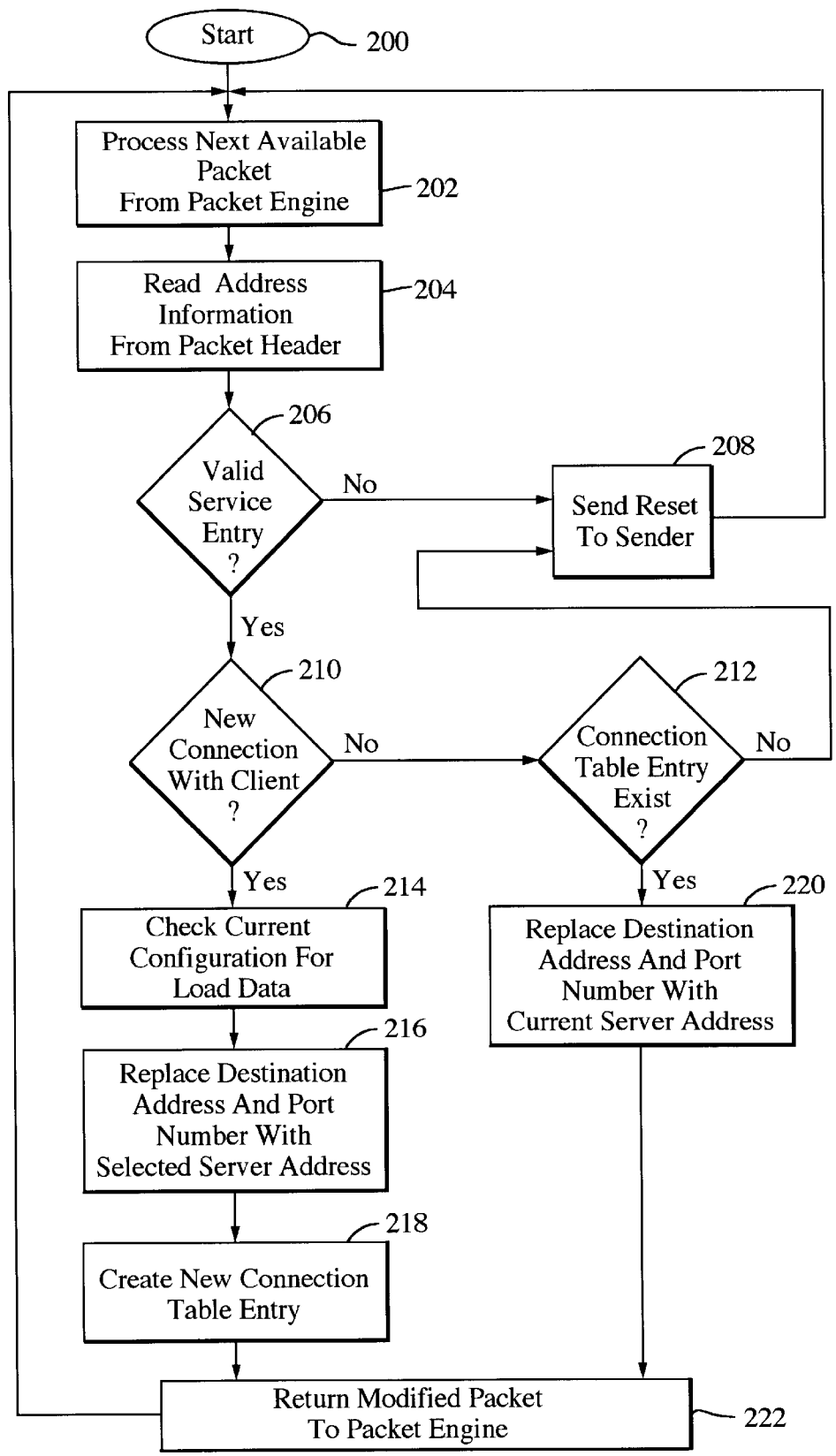
FIG. 6 is a flow chart illustrating operation of the packet filter module of the switching processor.

The flow chart of FIG. 6 illustrates the software process performed by the packet filter module 74 of FIG. 4. The process is initialized at step 200, during which the switching processor 44 performs certain start-up tasks as in step 100 discussed above. At step 202, the packet filter module 74 begins processing of a data packet retrieved by the packet engine module 72 as discussed above. The packet filter module 74 reads the TCP/IP or UDP data from the header of the data packet in step 204. The TCP/IP or UDP data will determine the subsequent processing and routing of the data packet. At step 206, the packet filter module 74 determines from the TCP/IP or UDP data whether the data packet is a valid service entry. In other words, the packet filter module 74 verifies that the data packet was properly routed to the load balancing and packet switching device 10, or whether it was routed improperly and received by the network interface in error. If the data packet is not a valid service entry, at step 208, the packet filter module 74 sends a TCP reset packet back to the originator of a TCP connection via the packet engine module 72 and the network interfaces, or simply discards the data packet of a UDP connection.

Assuming that the data packet is a valid service entry, the packet filter module 74 determines at step 210 whether the data packet is a new connection with a client. The packet filter module 74 checks the transport data in the data packet header against the entries in the connection table 66 in the shared memory 34 to determine whether previous data packets have been received from the same client previously. If it is a new connection, then the packet filter module 74 checks the configuration table 64 for the current load conditions to determine the routing of data packet. As discussed above, the packet filter module 74 may elect to send the data packet to the application server having the lightest current load. Alternatively, the packet filter module 74 may send the data packet to a certain one of the application servers based on particular aspects of the data packet, e.g., the data packet is part of a connection requiring processing capability unique to one of the application servers, or the data packet specifically requests action by a particular application server.

Once the packet filter module 74 determines which application server should receive the data packet, the packet filter module at step 216 re-writes the MAC address and optionally re-writes the IP address and TCP/UDP port number in the header of the data packet to reflect the address of the selected application server. Then, at step 218, a new entry is made in the connection table 66 to reflect the new connection. The packet filter module 74 then returns the modified data packet back to the packet engine module 72 at step 224 for forwarding to the appropriate network interface 37. The packet filter module 74 then returns to step 202 to process the next available data packet.

If it was determined at step 210 that the received data packet was not a new connection with the client, the packet filter module 74 determines at step 212 whether a corresponding entry in the connection table 66 exists. If there is no corresponding entry, a reset packet is sent for TCP connections or the packet is discarded for UDP connections at step 208. Conversely, if the connection table 66 has a corresponding entry for the data packet, then, at step 220, the packet filter module 74 re-writes the MAC address and optionally re-writes the IP address and TCP/UDP port number to reflect the application server and application that is already servicing the connection. The packet filter module 74 then returns the modified data packet back to the packet engine module 72 at step 224 for forwarding to the appropriate network interface 37. The packet filter module 74 then returns to step 202 to process the next available data packet.

Conventional dedicated switching processors include a control module and a switching module that are viewed by the external networks as a single network entity. The control module communicates with the switching module through special internal interfaces that add overhead to both the control module and the switching modules, and is thus undesirable. An advantage of the load balancing and packet switching system 10 of the present invention is that the control processor 42 and the switching processors $44_1$–$44_2$ may be viewed as entirely separate logical networking end points even though they both reside within a single physical device. Therefore, external clients may communicate with applications running on the control processor 42 by sending data packets through the switching processors $44_1$–$44_2$, which, in turn, route the data packets to the control processor. The control processor 42 reverses the order to send data packets back to the external clients.

Figure 7:
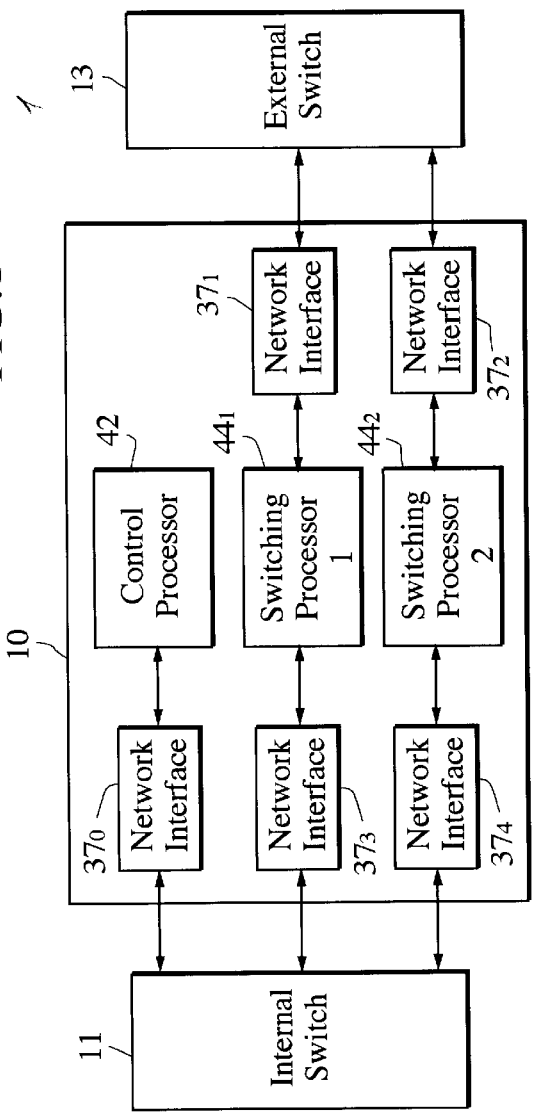
FIG. 7 is a block diagram illustrating a first embodiment of the invention having a pseudo-interface between the control processor and switching processors through the internal switch.

A first alternative embodiment of the invention is provided in FIG. 7, which illustrates a block diagram of a pseudo-interface between the control processor 42 and the switching processors $44_1$–$44_2$. As discussed above with respect to FIG. 1, the load balancing and packet switching device 10 communicates on the client side through an external switch 13 and on the back-end server side through an internal switch 11. More particularly, the switching processor $44_1$ communicates with the external switch 13 through the network interface $37_1$, the switching processor $44_2$ communicates with the external switch 13 through the network interface $37_2$. Similarly, the switching processor $44_1$ communicates with the internal switch 11 through the network interface $37_3$, and the switching processor $44_2$ communicates with the internal switch 11 through the network interface 37₄. The control processor 42 also communicates with the internal switch 11 through the network interface 37₀.

A virtual IP address is assigned to the network interface 37₀. When external devices on the client side of the network wish to communicate with the control processor 42, a data packet is transmitted through the external switch 13 to one of the switching processors 44₁–44₂, with the IP header 20c of the data packet listing the virtual IP address as the destination. The switching processor 44 then processes the incoming data packet in the manner described above with respect to FIGS. 5 and 6. Specifically, the packet filter module 74 of the switching processor re-writes the IP header 20c of the data packet to reflect the real IP address of the network interface 37₀. The packet engine module 72 then routes the modified data packet to the internal switch 11 through a corresponding one of the network interfaces 37. The internal switch 11 then sends the modified data packet to the network interface 37₀ which then delivers the data packet to the control processor 42. The process is reversed for responses sent by the control processor 42 back to the external device that originated the connection. The control processor 42 sends a data packet via the network interface 37₀ having the real IP address through the internal switch 11 to one of the switching processors 44. The switching processor 44 re-writes the IP address to the virtual IP address known to the external device. The modified data packet is then sent out by the switching processor 44 through the external switch 13.

Figure 8:
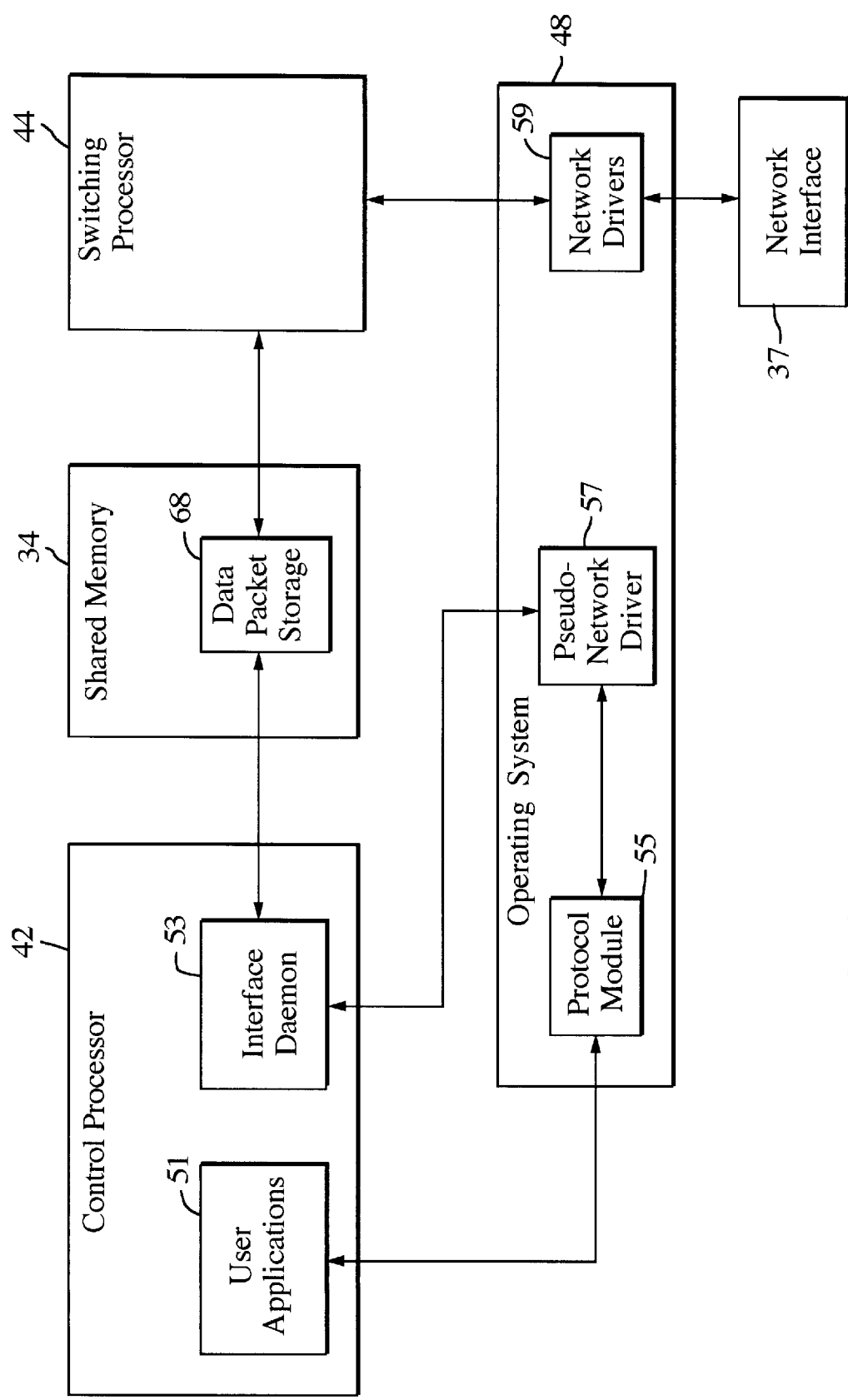
FIG. 8 is a block diagram illustrating a second embodiment of the invention having a pseudo-interface between the control processor and switching processors through a driver operating on the control processor.

A second alternative embodiment of the invention is provided in FIG. 8, which illustrates a block diagram of a pseudo-interface between the control processor 42 and a switching processor 44. The control processor 42 actually operates at two levels in a time-shared manner, referred to as a user level and an operating system level. The user level comprises the systems accessible to the user, and may include one or more user application programs 51 executing thereon, such as an e-mail program, a server application, and/or an Internet browser. The resource manager 52 and master module 54 described above with respect to FIG. 4 also execute in the user level. The operating system level, also known as the kernel, provides the basic services for the control processor 42 as well as the switching processor 44, such as activating the hardware directly or interfacing to another software layer that drives the hardware.

As shown in FIG. 8, the operating system 48 further includes a protocol module 55, a pseudo-network driver 57, and a network driver 59. The protocol module 55 serves as a data interface for the user application programs 51. The protocol module 55 converts received data packets that are directed to one of the user application programs 51 from the TCP/IP or UDP/IP protocols into a format usable by the user application programs. Specifically, the protocol module 55 strips off the MAC header 20d, IP header 20c, and TCP header 20b, leaving the data portion 20a of the data packet 20 (see FIG. 9). The data portion 20a is then provided to the user application programs 51. Conversely, the protocol module 55 formats data sent out from the user application programs 51 into data packets in accordance with the TCP/IP or UDP/IP protocols, by adding the MAC header 20d, IP header 20c, and TCP (or UDP) header 20b.

The network drivers 59 provide an interface between the hardware network interfaces 37 and the software switching processor 44. As illustrated in FIG. 8, the control processor 42 does not have a direct connection to the network drivers 59. Instead, the pseudo-network driver 57 is configured to appear to the user application programs 51 as a hardware network interface. The pseudo-network driver 57 may be provided by a STREAMS mechanism, which is a feature of a UNIX-based system that provides a standard way of dynamically building and passing messages up and down a message stack. Ordinarily, messages from a user application are passed "downstream" to the network driver at the end of the stack, and messages from the network driver are passed "upstream" to the user application. In the present invention, the pseudo-network driver 57 provides a message stack that is accessed through the use of system calls issued by the user application programs 51 to communicate with remote devices through the pseudo-network driver 57. As will be further described below, a data packet storage area 68 within the shared memory 34 appears to the user application programs 51 as such a remote device.

The interface daemon 53 is a program that executes in the background in the user level of the control processor 42 to communicate with the switching processor 44 and the pseudo-network driver 57 to initiate transfers of data packets therebetween. As described above with respect to FIGS. 5 and 6, the switching processors 44 receive incoming data packets from remote devices through the network interfaces 37. At step 204 of FIG. 6, the packet filter module 74 reads the MAC address and IP information from the header of a received data packet in order to determine routing of the data packet. If the packet switching processor 44 determines at step 204 that the intended destination for the data packet is one of the user applications 51 running on the control processor 42, the data packet is written into the data packet storage location 68 of the shared memory 34. The switching processor 44 then signals the interface daemon 53 of the availability of the data packet. The interface daemon 53 moves the received data packet to the pseudo-network driver 57. The received data packet is then processed through the protocol module 55 as if it were an incoming data packet received through an actual network interface.

To send data packets that originate in one of the user applications 51 to a remote device, the foregoing process is reversed. More particularly, data packets from the user applications 51 are passed to the pseudo-network driver 57, and the interface daemon 53 monitors the pseudo-network driver for data packets. Once a data packet arrives at the pseudo-network driver from the user application 51, the interface daemon 53 reads the data packet and places it in the data packet storage location 68 of the shared memory 34. Then, the interface daemon 53 signals the switching processor 44 of the availability of the data packet in the data packet storage location 68. The switching processor 44 then retrieves the data packet from the shared memory 34, and routes the data packet to one of the network interfaces 37 in the same manner as described above. As a result, remote devices can communicate with user applications 51 running on the control processor 42 even though the control processor does not have a direct connection to a network interface. The user applications 51 executing on the control processor 42 think they are communicating directly with actual network interfaces.

As discussed above, user applications ordinarily operate at the user level, and data input and output is handled at the operating system level. The operating system communicates with the network devices and issues interrupts to the network applications at the user level to indicate the receipt of data. These conventional systems are inefficient since processing of the network applications is stopped each time an interrupt is issued, and the involvement of the operating system further reduces the efficiency of the user applications. It would therefore be desirable to give the network applications direct access to the network interfaces and to run the network applications on a dedicated processor which is not interrupted. Certain network applications such as Internet telephony or fax applications would particularly benefit from such direct network access.

Figure 10:
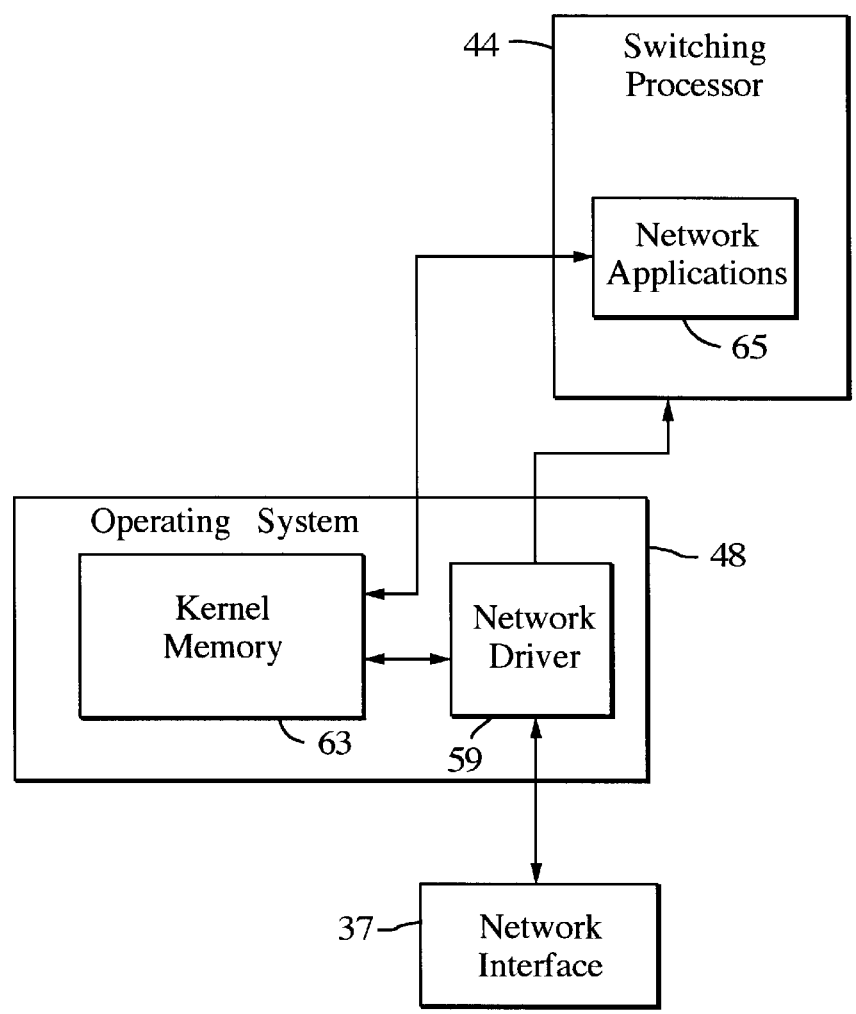
FIG. 10 is a block diagram illustrating a third embodiment of the invention having a user-level network interface for applications operating on the switching processor.

A third embodiment of the invention is provided at FIG. 10, which illustrates a block diagram of a user-level network interface for applications running on the switching processor 44. The user-level network interface overcomes the inefficiencies of the conventional systems discussed above. In FIG. 10, the switching processor 44 has certain network applications 65 running thereon, including the packet switching functions described above. The network applications 65 and the packet switching program have direct access to a list of buffers in the kernel memory 63. In an Ethernet network, each network interface 37 has a list of buffers associated with it. These buffers can be used to transmit data as well as receive data. A network driver 59 on the operating system 48 communicates with the network interface 37 in the manner described previously, and also has access to the buffer list in the kernel memory 63.

In particular, the buffer list includes descriptors that identify the address of each buffer within the kernel memory 63, the length of the data stored in the buffer, and an ownership identification of the buffer (i.e., whether the buffer is presently "owned" or controlled by the network interface hardware or the network application software). The network interface 37 circles through the buffer list in the kernel memory 63 to access the buffers in order to send or receive data as necessary. Similarly, the network applications 65 on the switching processor 44 circle through the list of buffers to process the data. If the network interface 37 transmits data from a particular buffer, the network applications 65 reclaim the buffer and return it to a free buffer pool. Conversely, if the network interface 37 has just received data and placed the data in a particular buffer, the network applications 65 process the data.

Figure 13:
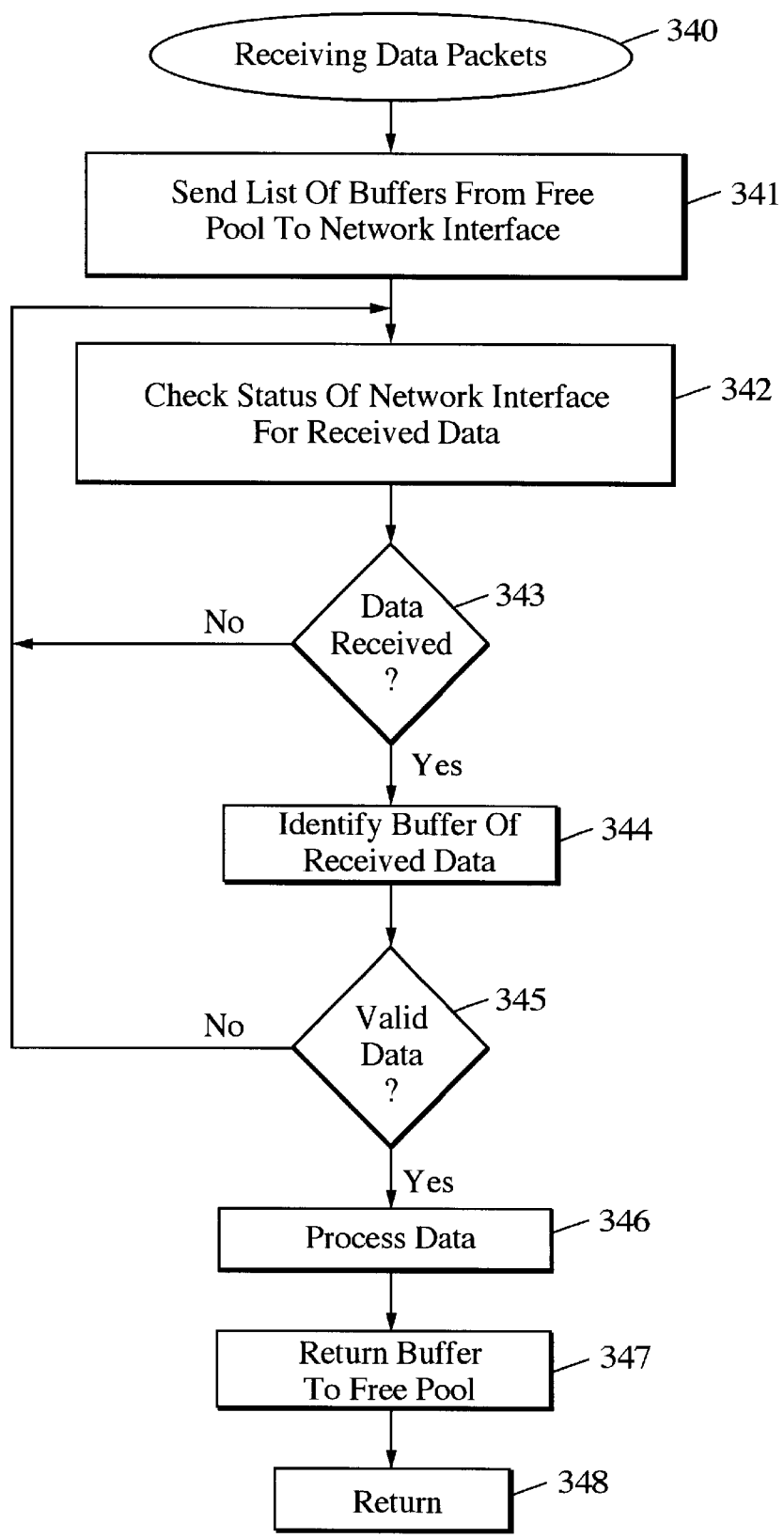
FIG. 13 is a flow chart illustrating a process of receiving data packets from a network interface at the user level.

FIGS. 11–13 illustrate the processes performed by the switching processor 44 to initiate the direct user access to the network interfaces, to send data packets to the network interfaces, and to receive data packets from the network interfaces. As shown in FIG. 11, the switching processor 44 is initiated in a process beginning at step 300. At step 301, all interrupts to the switching processor 44 are disabled so that the switching program and any network application programs are run exclusively on the processor. Any interrupts from any device are thereafter delivered to the control processor 42. Next, at step 302, the kernel memory 63 that is to be shared between the network interfaces 37 and the network applications 65 operating on the switching processor 44 is allocated. All the buffers within the kernel memory 63 are mapped to all of the network interfaces 37 so that any buffer can be used to transmit or receive data through any of the network interfaces. Lastly, at step 303, the network interfaces' registers and buffers are mapped to the network applications 65. This enables the network applications 65 to directly control the network interfaces 37 by changing the content of the registers and to perform read/write operations from/to the buffers directly.

Once the switching processor 44 is initiated in this manner, all data accesses from/to the network interfaces operate like conventional memory read/write operations by the network applications. High efficiency results from the fact that the network applications 65 and the switching program run on a single thread on a dedicated, non-interruptable processor. Also, there is no context switching since the programs running on the switching processor 44 are isolated as a separate group that is not available to any other processes or threads in the multiprocessor system.

The process of sending data from one of the network applications 65 to the network interface 37 is illustrated in FIG. 12, and begins with step 320. At step 321, the network application 65 gets the next available buffer from the free buffer pool. The free buffer pool may be maintained as a table within the kernel memory 63. The network application 65 then writes the data to be transmitted in the form of a data packet into the identified buffer at step 322, and changes the "ownership" of the buffer to the network interface 37 at step 323. At step 324, the network application 65 indicates to the network interface 37 that a buffer contains data ready to be transmitted. At step 325, the network application 65 periodically checks to see if the data has been transmitted. Once the data has been transmitted, the network application 65 returns the buffer to the free pool at step 326. At step 327, the network application 65 returns to performing other tasks.

The process of receiving data from the network interface 37 to one of the network applications 65 is illustrated in FIG. 13, and begins with step 340. At step 341, the network application 65 passes a list of available buffers from the free buffer pool to the network interface 37. At step 342, the network application 65 checks the status of the network interface 37 to see if data has been received. If no data has been received, step 343 causes the program to loop back and repeat step 342. If data has been received by the network interface 37, the network application 65 identifies the buffer into which the data has been received by checking the ownership bit at step 344. The network application 65 next verifies that valid data was received into the buffer at step 345, and if the data is not valid then the program returns to step 342. Conversely, if the received data is valid, then the network application 65 processes the data at step 346. Thereafter, the network application 65 returns the buffer to the free buffer pool at step 347. At step 348, the network application 65 returns to performing other tasks.

Having thus described a preferred embodiment of a computer data packet switching and load balancing system using a general-purpose symmetrical multiprocessor architecture, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. A multiprocessor computer system, comprising:
  a plurality of network interfaces each adapted to be coupled to respective external networks for receiving and sending data packets to and from remote devices coupled to said external networks via a particular communication protocol;
  a plurality of symmetrical processors including a control processor and at least one switching processor, said at least one switching processor further including at least one network application executing thereon, said control processor further including an operating system portion that includes a kernel memory and at least one network driver communicating with said plurality of network interfaces; and
  a buffer descriptor list accessible by said at least one network application and said at least one network driver, said buffer descriptor list defining status of buffers provided in said kernel memory used for temporary storage of data packets transferred between said at least one network application and said plurality of network interfaces via said network driver;

wherein, data packets received by said network interfaces from said external networks directed to said at least one network application are placed in selected ones of said buffers by said network driver for direct access by said at least one network application, and data packets transmitted from said at least one network application to said external networks are placed in other selected ones of said buffers for direct access by said network driver.

2. The multiprocessor computer system of claim 1, wherein said at least one switching processor further includes stored instructions to be executed by said at least one switching processor, said stored instructions comprising the steps of:

disabling interrupts directed to said at least one switching processor; and circling through said buffer descriptor list to monitor ownership status of said buffers.

3. The multiprocessor computer system of claim 2, wherein said stored instructions further comprise:

for receiving a data packet from said external networks, identifying one of said buffers reflecting ownership by one of said network applications, processing a data packet stored in said one of said buffers, and restoring said one of said buffers to a free status.

4. The multiprocessor computer system of claim 2, wherein said stored instructions further comprise:

for transmitting a data packet from said at least one network application, identifying a free one of said buffers, storing a data packet in said free buffer, and changing ownership status of said free buffer to reflect ownership by one of said plurality of network interfaces.

5. The multiprocessor computer system of claim 1, wherein said control processor receives raw load status data from said external networks and generates load distribution configuration data therefrom, said load distribution configuration data being accessible by said at least one switching processor, said at least one switching processor routing received ones of said data packets not directed to said at least one network application to a selected one of said external networks in accordance with information included in a header portion of said data packets and said load distribution configuration data.

6. The multiprocessor computer system of claim 1, wherein said at least one switching processor further provides periodic polling of corresponding ones of said network interfaces for detecting received ones of said data packets therein.

7. The multiprocessor computer system of claim 5, wherein said at least one switching processor further re-writes said routing information included in said header portion of said data packets to reflect said selected one of said external networks.

8. The multiprocessor computer system of claim 5, further comprising a shared memory including a connection table reflecting status of previously received ones of said data packets.

9. The multiprocessor computer system of claim 8, wherein said at least one switching processor accesses said connection table to determine correspondence between a received one of said data packets and said previously received ones of said data packets in determining said selected one of said external networks.

10. The multiprocessor computer system of claim 8, wherein said memory further comprises a configuration table containing said load distribution configuration data.

11. The multiprocessor computer system of claim 5, wherein said at least one switching processor further includes a switching program having an engine module containing stored instructions to be executed by said at least one switching processor, said stored instructions comprising the steps of:

polling a first one of said network interfaces for presence of a received data packet;

if a received data packet is present at said first one of said network interfaces, routing said received data packet to said selected one of said external networks; and if a received one of said data packets is not present at said first one of said network interfaces, polling another one of said network interfaces for presence of a received data packet.

12. The multiprocessor computer system of claim 8, wherein said at least one switching processor further includes; a filter module having stored instructions to be executed by said at least one switching processor, said stored instructions comprising the steps of:

reading routing information from said header portion of said data packet;

accessing said load distribution configuration data stored in said shared memory;

selecting said selected one of said external networks based on said routing information and said load distribution configuration data;

modifying said data packet by re-writing said routing information to reflect said selected one of said external networks; and sending said modified data packet to one of said plurality of network interfaces corresponding to said selected one of said external networks.

13. The multiprocessor computer system of claim 12, wherein said stored instructions of said filter module further comprises the steps of:

reading transport information from said header portion of said data packet; and accessing connection status data stored in a connection table of said shared memory reflecting status of previously received -ones of said data packets, wherein, if said transport information indicates that said data packet corresponds to a previously received data packet, then said selecting step further comprises selecting said selected one of said external networks based on routing of said previously received data packet.

14. In a multiprocessor computer system comprising a plurality of symmetrical processors and a plurality of network interfaces each adapted to be coupled to respective external networks for receiving data packets from remote devices and sending data packets thereto via a particular communication protocol, a method for operating said computer system comprises the steps of:

configuring one of said plurality of processors as a control processor and others of said plurality of processors as switching processors, said control processor further having an operating system portion that includes a kernel memory and at least one network driver communicating with said plurality of network interfaces, at least one of said switching processors further including a network application executing thereon;

providing a buffer descriptor list accessible by said network application and said at least one network driver, said buffer descriptor list defining status of plural buffers provided in said kernel memory used for temporary storage of data packets transferred between said network application and said plurality of network interfaces via said network driver;

placing incoming data packets received by said network interfaces from said external networks directed to said at least one network application in selected ones of said buffers by said network driver for direct access by said network application; and placing outgoing data packets transmitted from said at least one network application to said external networks in other selected ones of said buffers for direct access by said network driver.

15. The method of claim 14, further comprising the steps of:

disabling interrupts directed to said at least one switching processor; and circling through said buffer descriptor list to monitor ownership status of said buffers.

16. The method of claim 14, wherein said step of placing incoming data packets further comprises:

identifying one of said buffers reflecting ownership by said network application, processing a data packet stored in said one of said buffers, and restoring said one of said buffers to a free status.

17. The method of claim 14, wherein said step of placing outgoing data packets further comprise:

identifying a free one of said buffers, storing a data packet in said free buffer, and changing ownership status of said free buffer to reflect ownership by one of said plurality of network interfaces.

18. The method of claim 14, further comprising the steps of:

providing load data to said control processor regarding load status of said external networks;

generating load distribution configuration data from said load data using said control processor and providing said load distribution configuration data for access by said data packet switching processors; and routing a received data packets not directed to said network application using said switching processors to a selected one of said external networks in accordance with information included in a header portion of said data packet and said load distribution configuration data.

19. The method of claim 18, further comprising the step of re-writing said routing information included in said header portion of said data packets by said switching processors to reflect said selected one of said external networks.

20. The method of claim 18, further comprising the step of providing a connection table reflecting status of previously received ones of said data packets.

21. The method of claim 20, further comprising accessing said connection table by said switching processors to determine correspondence between said received one of said data packets and said previously received ones of said data packets in determining said selected one of said external networks.

22. The method of claim 18, further comprising providing a configuration table containing said load distribution configuration data.

23. The method of claim 14, wherein said particular communication protocol further comprises TCP/IP.

* * * * *